United States Patent
Ohtsu et al.

(10) Patent No.: US 7,823,478 B2
(45) Date of Patent: Nov. 2, 2010

(54) INFINITELY ADJUSTABLE STEERING COLUMN ASSEMBLY

(75) Inventors: Hitonobu Ohtsu, Tokyo (JP); Richard P. Nash, Frankenmuth, MI (US); Richard K. Riefe, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 218 days.

(21) Appl. No.: 11/527,039

(22) Filed: Sep. 26, 2006

(65) Prior Publication Data

US 2008/0072700 A1    Mar. 27, 2008

(51) Int. Cl.
B62D 1/18 (2006.01)
(52) U.S. Cl. .......................................... 74/493; 280/775
(58) Field of Classification Search ................. 74/493, 74/492; 70/252; 292/342, 343; 280/775, 280/777
See application file for complete search history.

(56) References Cited

U.S. PATENT DOCUMENTS

| | | | |
|---|---|---|---|
| 3,491,614 A * | 1/1970 | Demske et al. ................ 74/493 |
| 3,570,322 A * | 3/1971 | Krouse ........................ 74/493 |
| 3,962,931 A | 6/1976 | Moneta |
| 4,195,535 A | 4/1980 | Broucksou |
| 4,481,838 A | 11/1984 | Findley et al. |
| 4,554,843 A | 11/1985 | Andersson |
| 4,607,540 A | 8/1986 | Kinoshita et al. |
| 5,029,489 A | 7/1991 | Burmeister et al. |
| 5,199,319 A | 4/1993 | Fujiu |
| 5,492,430 A * | 2/1996 | Jones ..................... 403/109.5 |
| 5,570,610 A | 11/1996 | Cymbal |
| 5,626,363 A | 5/1997 | Rispeter |
| 5,823,062 A | 10/1998 | Snell et al. |
| 5,979,265 A | 11/1999 | Kim et al. |
| 6,237,439 B1 | 5/2001 | Weber et al. |
| 6,282,977 B1 | 9/2001 | Satoh et al. |
| 6,460,427 B1 | 10/2002 | Hedderly |
| 7,021,660 B2 | 4/2006 | D'Agostino et al. |
| 2002/0066334 A1 * | 6/2002 | Kim et al. .................... 74/493 |
| 2005/0183534 A1 | 8/2005 | Maida et al. |
| 2005/0269811 A1 | 12/2005 | Schneider et al. |

FOREIGN PATENT DOCUMENTS

EP    1211155    6/2002

* cited by examiner

*Primary Examiner*—Richard W Ridley
*Assistant Examiner*—Alan B Waits
(74) *Attorney, Agent, or Firm*—Cantor Colburn LLP

(57) ABSTRACT

An adjustable steering column assembly having an outer jacket, an inner jacket, and a tilt housing. A longitudinal locking device moves between released and engaged positions allowing and preventing longitudinal movement of the inner jacket relative to the outer jacket. A tilt locking device moves between released and engaged positions allowing and preventing tilting movement of the tilt housing relative to the inner jacket. A control lever is coupled to both of the longitudinal locking device and the tilt locking device for simultaneously moving the devices between the released and engaged positions. The longitudinal locking device has first and second members each having interengaging chamfers. The first member has an engagement surface abutting an abutment surface of the inner jacket when in the engaged position to prevent the longitudinal movement of the inner jacket relative to the outer jacket. The engagement and abutment surfaces are preferably uninterrupted along a longitudinal axis to provide an infinite number of adjustment positions for the inner jacket.

9 Claims, 10 Drawing Sheets

INFINITELY ADJUSTABLE STEERING COLUMN ASSEMBLY

BACKGROUND OF THE INVENTION

1. Field of the Invention

The subject invention relates to adjustable steering column assemblies for vehicles.

2. Description of Related Art

Steering column assemblies having a steering wheel that is adjustable telescopingly or tilting or both are well known in the automotive industry. Adjustable steering wheels provide both optimal and ergonomically correct positions of the steering wheel relative to a driver. Many conventional adjustable steering columns assemblies require separate locking mechanisms for the telescoping and tilting movement of the steering wheel, which is inconvenient for the driver.

The prior art has contemplated a marriage of the locking mechanisms such that a single lever may operate both the telescoping and tilting movement of a steering wheel. U.S. Pat. Nos. 6,237,439 and 6,460,427 disclose adjustable steering column assemblies utilizing a single lever for both telescoping and tilting movement. These prior art designs, however, are relatively complex and require the use of various rack and pinion arrangements.

Accordingly, it would be desirable to design a single locking lever that can operate both telescoping and tilting movement in a less complex manner than the prior art. Also, it is desirable that the telescoping movement of the steering wheel have an infinite number of adjustment positions to provide further convenience to the driver.

SUMMARY OF THE INVENTION AND ADVANTAGES

The subject invention provides an adjustable steering column assembly for a vehicle. The assembly comprises an outer jacket adapted to be mounted to the vehicle with the outer jacket defining a longitudinal axis. An inner jacket is coupled to the outer jacket and moves relative to the outer jacket along the axis between a plurality of longitudinal adjustment positions with the inner jacket having an abutment surface. A longitudinal locking device is supported by the outer jacket and moves between a released position allowing longitudinal movement of the inner jacket relative to the outer jacket along the axis and an engaged position preventing the longitudinal movement of the inner jacket relative to the outer jacket. A tilt housing is pivotally coupled to the inner jacket and moves relative to the inner jacket between a plurality of tilting adjustment positions. A tilt locking device is disposed between the inner jacket and the tilt housing and moves between a released position allowing tilting movement of the tilt housing relative to the inner jacket and an engaged position preventing the tilting movement of the tilt housing relative to the inner jacket. A control lever is movably mounted to the tilt housing and is coupled to both of the longitudinal locking device and the tilt locking device for moving the devices between the released and engaged positions. The longitudinal locking device has first and second members each having interengaging chamfers for facilitating movement of the first member into the engaged position. The first member has an engagement surface abutting the abutment surface of the inner jacket when in the engaged position to prevent the longitudinal movement of the inner jacket relative to the outer jacket.

The subject invention also provides an adjustable steering column assembly having a uniquely configured longitudinal locking device. The longitudinal locking device has the first and second members with each having interengaging chamfers for facilitating movement of the first member into the engaged position. The first member has an engagement surface abutting the abutment surface of the inner jacket when in the engaged position with the engagement and abutment surfaces being uninterrupted along the longitudinal axis to provide an infinite number of adjustment positions for the inner jacket.

Accordingly, the subject invention provides for an eloquent and simplified design of an adjustable steering column assembly having both longitudinal (telescoping) and tilting locking devices that are controlled by a single control lever. Also, the subject invention provides for an improved longitudinal locking device design which does not require the use of a rack and pinion arrangement.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
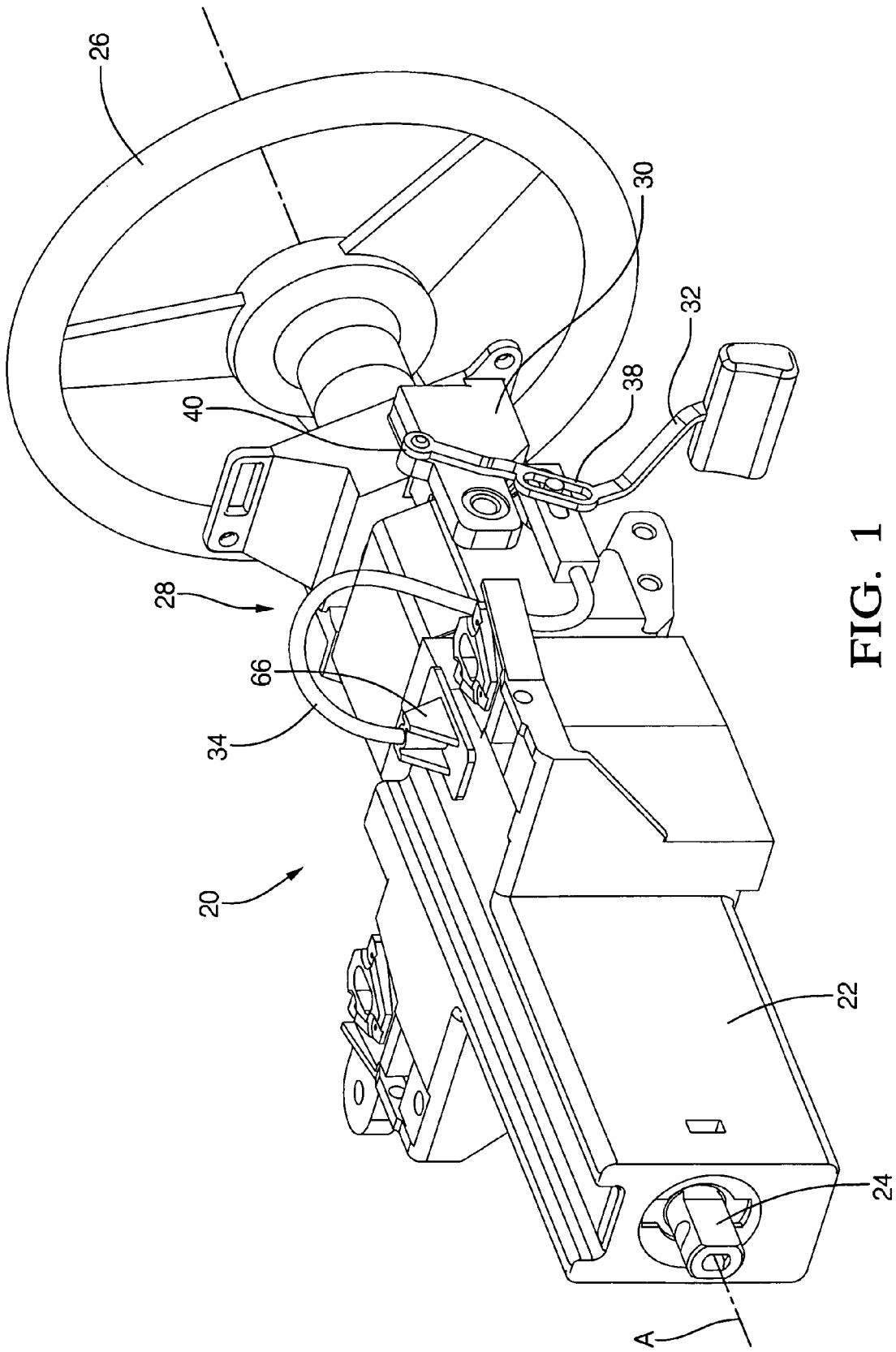
FIG. 1 is a perspective view of an adjustable steering column assembly in accordance with a first embodiment of the subject invention.

Referring to the Figures, wherein like numerals indicate like or corresponding parts throughout the several views, an adjustable steering column assembly for a vehicle (not shown) in accordance with a first embodiment of the invention is shown at 20 in FIG. 1. The adjustable steering column assembly 20 comprises an outer jacket 22 adapted to be mounted to the vehicle in any suitable manner. A steering shaft 24, which supports a steering wheel 26, is coupled to the outer jacket 22. The outer jacket 22, steering shaft 24, and steering wheel 26 may be of any suitable configuration as known in the art.

A tilt housing 28 is pivotally coupled to the outer jacket 22 and moves relative to the outer jacket 22 between a plurality of tilting adjustment positions as is known in the art. The steering shaft 24 is also mounted to the tilt housing 28 and is also movable with the tilt housing 28. The tilt housing 28 may be of any suitable configuration and is coupled to the outer jacket 22 through a tilting mechanism. A tilt locking device 30 is disposed between the outer jacket 22 and the tilt housing 28 and moves between a released position allowing tilting movement of the tilt housing 28 and an engaged position preventing the tilting movement of the tilt housing 28. Tilting mechanisms and tilt locking devices are well known in the industry such that this mechanism and device will not be discussed in any greater detail.

A control lever 32 is movably mounted to the tilt housing 28. Preferably, a cable 34 is interconnected between the control lever 32 and a longitudinal locking device 36, which is discussed in greater detail below. Even more preferably, the control lever 32 includes a first section 38 and a second section 40 with the cable 34 mounted to the first section 38 and the tilt locking device 30 coupled to the second section 40. The coupling of the tilt locking device 30 to the control lever 32 is also known to those in the industry and will therefore not be discussed in any greater detail.

Referring to FIGS. 1-4, the outer jacket 22 includes a bore 42 defining a longitudinal axis A. The outer jacket 22 also includes a vertical chamber 44 and a horizontal chamber 46 with the horizontal chamber 46 being open to the bore 42 of the outer jacket 22. Preferably, the vertical chamber 44 extends a majority of the height of the outer jacket 22 and the horizontal chamber 46 extends from the vertical chamber 44 to the bore 42.

An inner jacket 48 is coupled to the outer jacket 22 and moves relative to the outer jacket 22 along the axis A between a plurality of longitudinal adjustment positions. The inner jacket 48 may be of any suitable configuration and cooperates with the bore 42 to move in a telescoping fashion along the longitudinal axis A. The steering shaft 24 is mounted to the inner jacket 48 and is movable with the inner jacket 48 along the axis A. As will be discussed in greater detail below, the inner jacket 48 has an abutment surface 50, which is preferably inclined.

The longitudinal locking device 36 is supported by the outer jacket 22 and moves between a released position allowing longitudinal movement of the inner jacket 48 relative to the outer jacket 22 along the axis A and an engaged position preventing the longitudinal movement of the inner jacket 48 relative to the outer jacket 22. The longitudinal locking device 36 is disposed within the chambers 44, 46 of the outer jacket 22 and partially extends into the bore 42 of the outer jacket 22. The longitudinal locking device 36 will be discussed in greater detail below.

The tilt housing 28 is also pivotally coupled to the inner jacket 48 and moves relative to the inner jacket 48 between the plurality of tilting adjustment positions. The tilt housing 28 is also coupled to the inner jacket 48 through the tilting mechanism. Further, the tilt locking device 30 is disposed between the inner jacket 48 and the tilt housing 28 and moves between the released position allowing tilting movement of the tilt housing 28 relative to the inner jacket 48 and the engaged position preventing the tilting movement of the tilt housing 28 relative to the inner jacket 48.

The control lever 32 is coupled to both of the longitudinal locking device 36 and the tilt locking device 30 for simultaneously moving the devices 36, 30 between the released and engaged positions. Preferably, as mentioned above, the cable 34 is interconnected between the control lever 32 and the longitudinal locking device 36.

Figure 2:
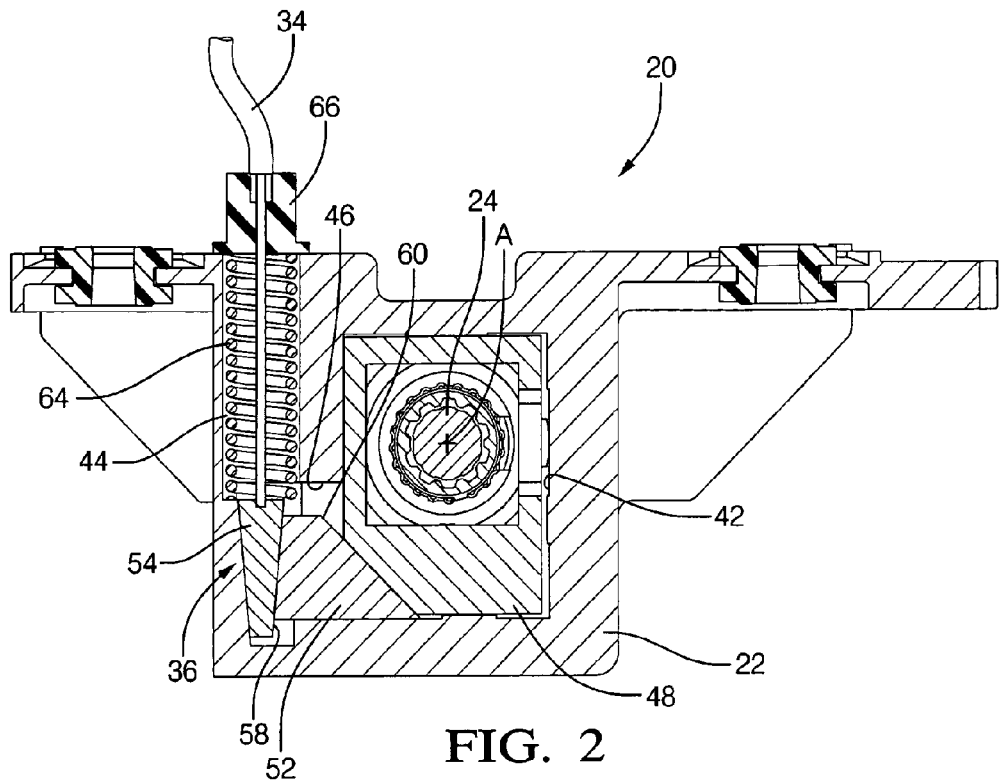
FIG. 2 is a cross-sectional view of the adjustable steering column assembly of FIG. 1 with a longitudinal locking device in an engaged position.
Figure 3:
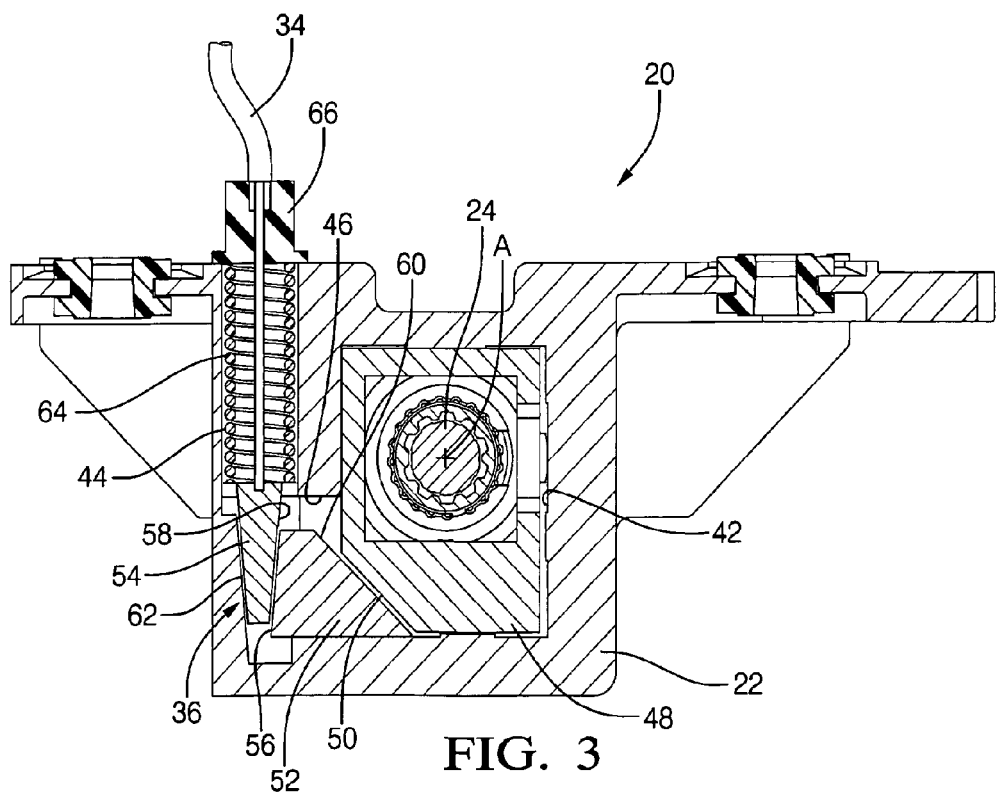
FIG. 3 is a cross-sectional view of the adjustable steering column assembly of FIG. 1 with the longitudinal locking device in a released position.
Figure 4:
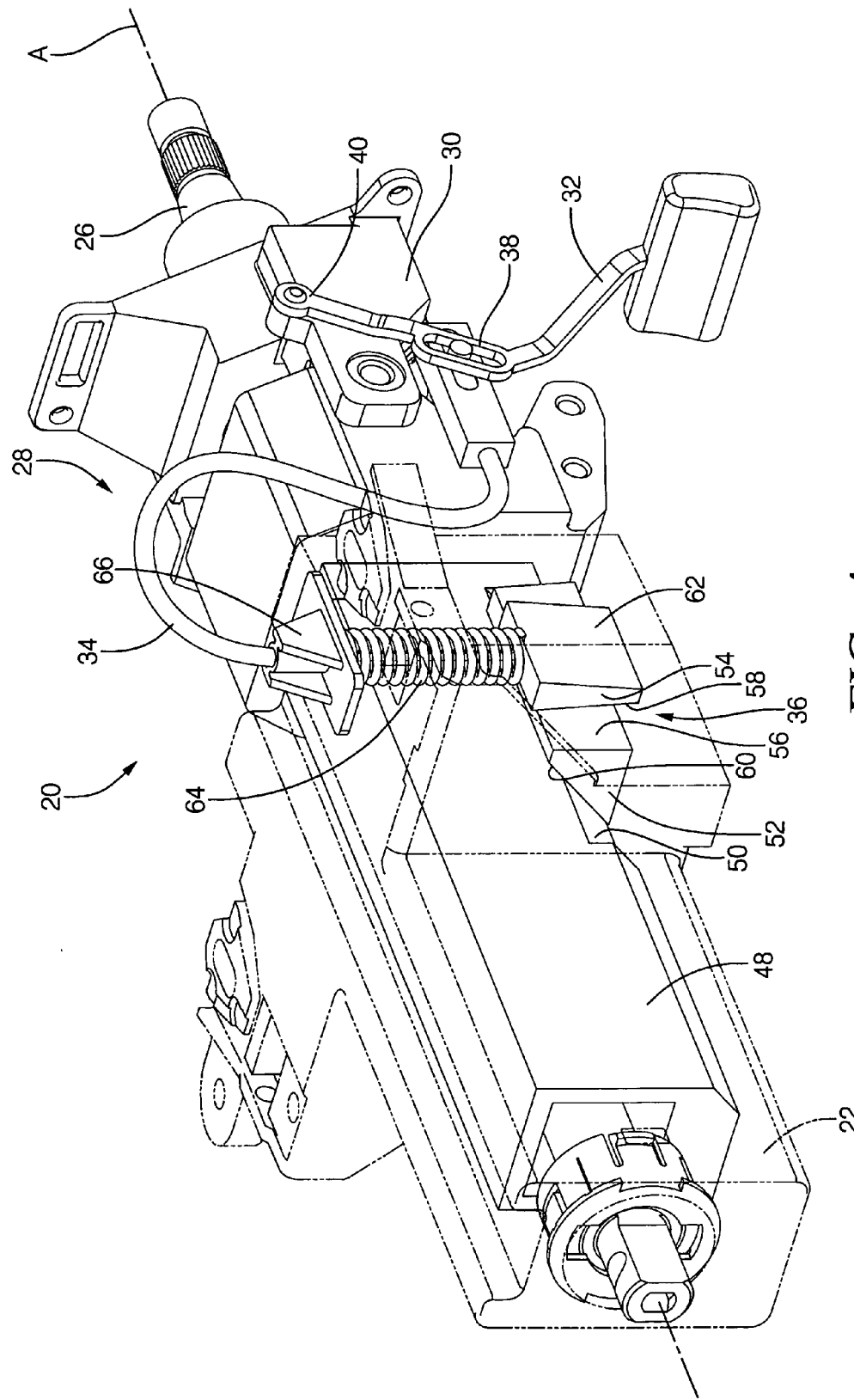
FIG. 4 is a perspective view of the adjustable steering column assembly of FIG. 1 with an outer jacket shown in phantom.

Referring to FIGS. 2-4, the longitudinal locking device 36 is now discussed in greater detail. The longitudinal locking device 36 includes a first member 52 that engages the inner jacket 48 and a second member 54 that is coupled to the control lever 32. The first member 52 is disposed within the horizontal chamber 46 of the outer jacket 22 and at least partially extends into the bore 42 of the outer jacket 22 for movement within the horizontal chamber 46 and the bore 42. The second member 54 is disposed within the vertical chamber 44 of the outer jacket 22 for movement within the vertical chamber 44.

Each of the first 52 and second 54 members have interengaging chamfers 56, 58 for facilitating movement of the first member 52 into the engaged position with the inner jacket 48. Preferably, a length of the first 52 and second 54 members, as measured along the axis A, is substantially equal such that the chamfer 58 of the second member 54 engages a majority of the chamfer 56 of the first member 52 when in the engaged position.

The first member 52 also has an engagement surface 60 abutting the abutment surface 50 of the inner jacket 48 when in the engaged position to prevent the longitudinal movement of the inner jacket 48 relative to the outer jacket 22. Preferably, the engagement surface 60 of the first member 52 is complementary in configuration with the abutment surface 50 of the inner jacket 48. Even more preferred, the engagement 60 and abutment 50 surfaces are inclined and are substantially parallel to each other when the first member 52 is in the engaged position. Hence, the engagement 60 and abutment 50 surfaces create a frictional effect between the first member 52 of the longitudinal locking device 36 and the inner jacket 48 for preventing the movement of the inner jacket 48 within the outer jacket 22. In the most preferred embodiment, the engagement 60 and abutment 50 surfaces are uninterrupted along the longitudinal axis A to provide an infinite number of adjustment positions for the inner jacket 48. In other words, the engagement 60 and abutment 50 surfaces are substantially smooth relative to each other and are devoid of any teeth or interlocking configurations along the length of the longitudinal axis A. Therefore, friction is the primary force preventing movement of the inner jacket 48 relative to the outer jacket 22 when the longitudinal locking device 36 is in the engaged position.

The chamfer 56 of the first member 52 is disposed on an opposing side of the first member 52 from the engagement surface 60. As illustrated, the first member 52 also includes a top and a bottom with the chamfer 56 and the engagement surface 60 of the first member 52 each angled inwardly toward the top such that a width of the top is smaller than a width of the bottom. An angle between the bottom and the chamfer 56 of the first member 52 is different than an angle between the bottom and the engagement surface 60 of the first member 52. The top and the bottom of the first member 52 have substantially flat parallel surfaces for defining a trapezoidal shaped first member 52 when viewed in cross-section.

The second member 54 includes a ramp 62 disposed on an opposing side of the second member 54 from the chamfer 58 of the second member 54 with the ramp 62 engaging the outer jacket 22. As illustrated, the second member 54 also includes a top and a bottom with the ramp 62 and the chamfer 58 of the second member 54 each angled inwardly toward the bottom such that a width of the bottom is smaller than a width of the top. An angle between the top and the ramp 62 of the second member 54 is substantially equal to an angle between the top and the chamfer 58 of the second member 54. The top and the bottom of the second member 54 have substantially flat parallel surfaces for defining a trapezoidal shaped second member 54 when viewed in cross-section.

A biasing device 64 reacts against the second member 54 to continuously bias the ramp 62 into engagement with the outer jacket 22. The biasing device 64 also continuously biases the chamfer 58 of the second member 54 into engagement with the chamfer 56 of the first member 52 for continuously biasing the first member 52 into the engaged position with the inner jacket 48. In the embodiment of FIGS. 2-4, the biasing device 64 is further defined as a coil spring. The biasing device 64 is disposed within the vertical chamber 44 of the outer jacket 22. Preferably, a cap 66 is mounted to the outer jacket 22 over the vertical chamber 44 and the biasing device 64 such that the biasing device 64 reacts between the cap 66 and the second member 54.

The cable 34 is interconnected between the control lever 32 and the second member 54 for facilitating the movement of the second member 54 into the released position against the continuous bias of the biasing device 64. Preferably, the cable 34 extends through the cap 66 and the biasing device 64 and is connected to the top of the second member 54. The control lever 32 is therefore coupled to the second member 54 through the cable 34 for moving the second member 54 into the released position against the continuous bias of the biasing device 64. The biasing force of the biasing device 64 is selected to provide adequate biasing pressure to secure the inner jacket 48 to the outer jacket 22 while also being soft enough to allow actuation of cable 34 and movement of the second member 54.

During an adjustment operation of the steering column assembly 20, a user actuates the control lever 32 to an unlocked position for simultaneously moving the longitudinal 36 and tilt 30 locking devices to the released positions. In particular, the cable 34 is pulled which in turn pulls the second member 54 upwardly against the bias of the biasing device 64. The chamfer 58 of the second member 54 is now spaced from the chamfer 56 of the first member 52. The first member 52 can therefore move to the released position in a linear fashion relative to the inner jacket 48 and transverse to the axis A, which reduces the frictional effect against the inner jacket 48. The inner jacket 48 can now be moved telescopingly along the longitudinal axis A relative to the outer jacket 22.

Once the adjustment of the inner jacket 48 is completed, the user actuates the control lever 32 to a locked position, which releases the pulling tension on the cable 34. The biasing device 64 automatically biases the second member 54 downwardly into the vertical chamber 44. The biasing of the second member 54 causes the ramp 62 to engage the outer jacket 22 simultaneously with the chamfer 58 of the second member 54 engaging the chamfer 56 of the first member 52. The first member 52 is then biased to move to the engaged position with the inner jacket 48 in a linear fashion relative to the inner jacket 48 and transverse to the axis A. Due to the ramp 62, chamfers 56, 58, engagement surface 60, and abutment surface 50, the biasing force or pressure of the biasing device 64 is amplified, which results in an adequate frictional effect being applied to the inner jacket 48 to secure the inner jacket 48 to the outer jacket 22. The amplification of the biasing force or pressure also allows for the biasing device 64 to be selected such that the cable 34 can pull the second member 54 upward against the biasing force.

Figure 5:
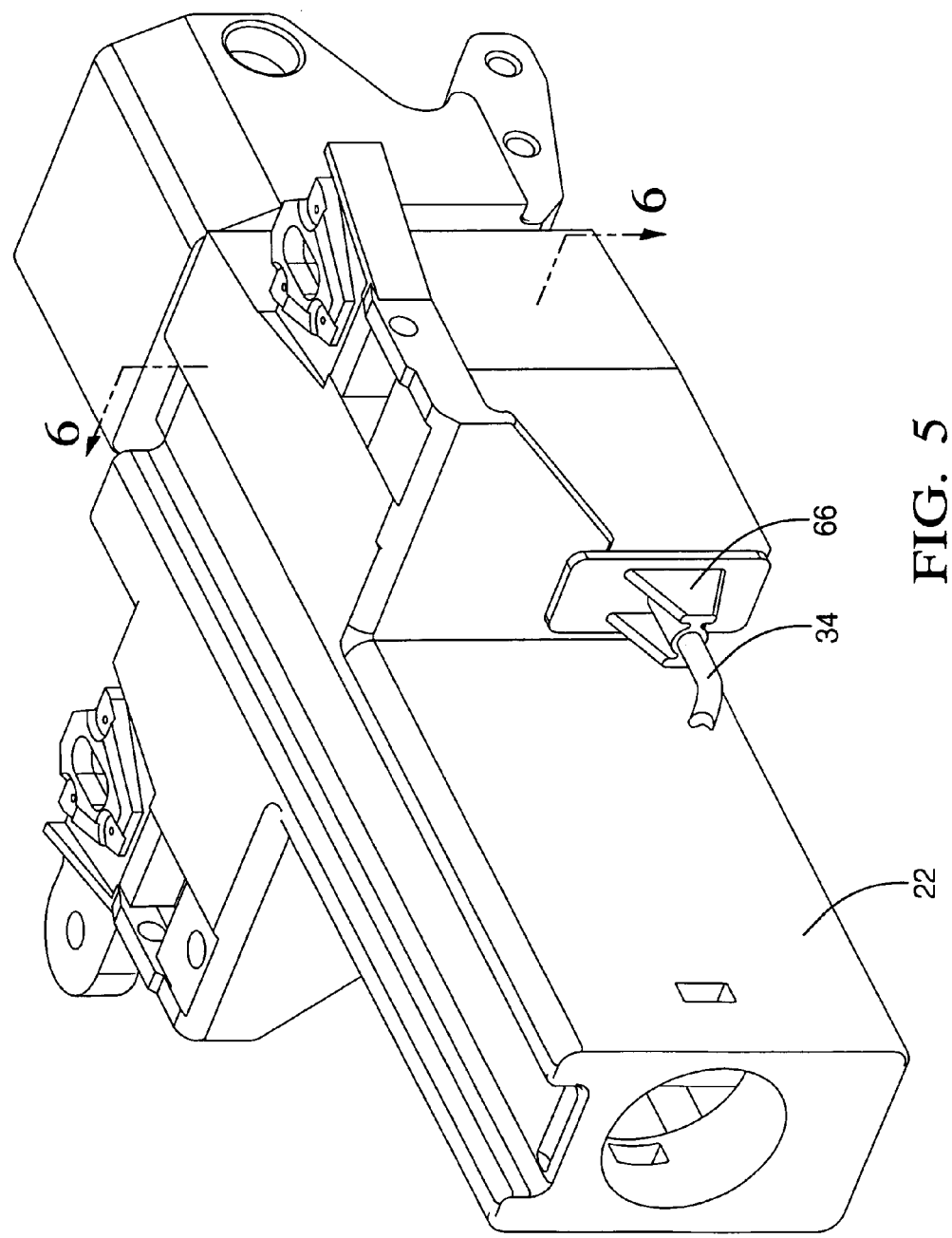
FIG. 5 is a perspective view of an adjustable steering column assembly in accordance with a second embodiment of the subject invention.
Figure 6:
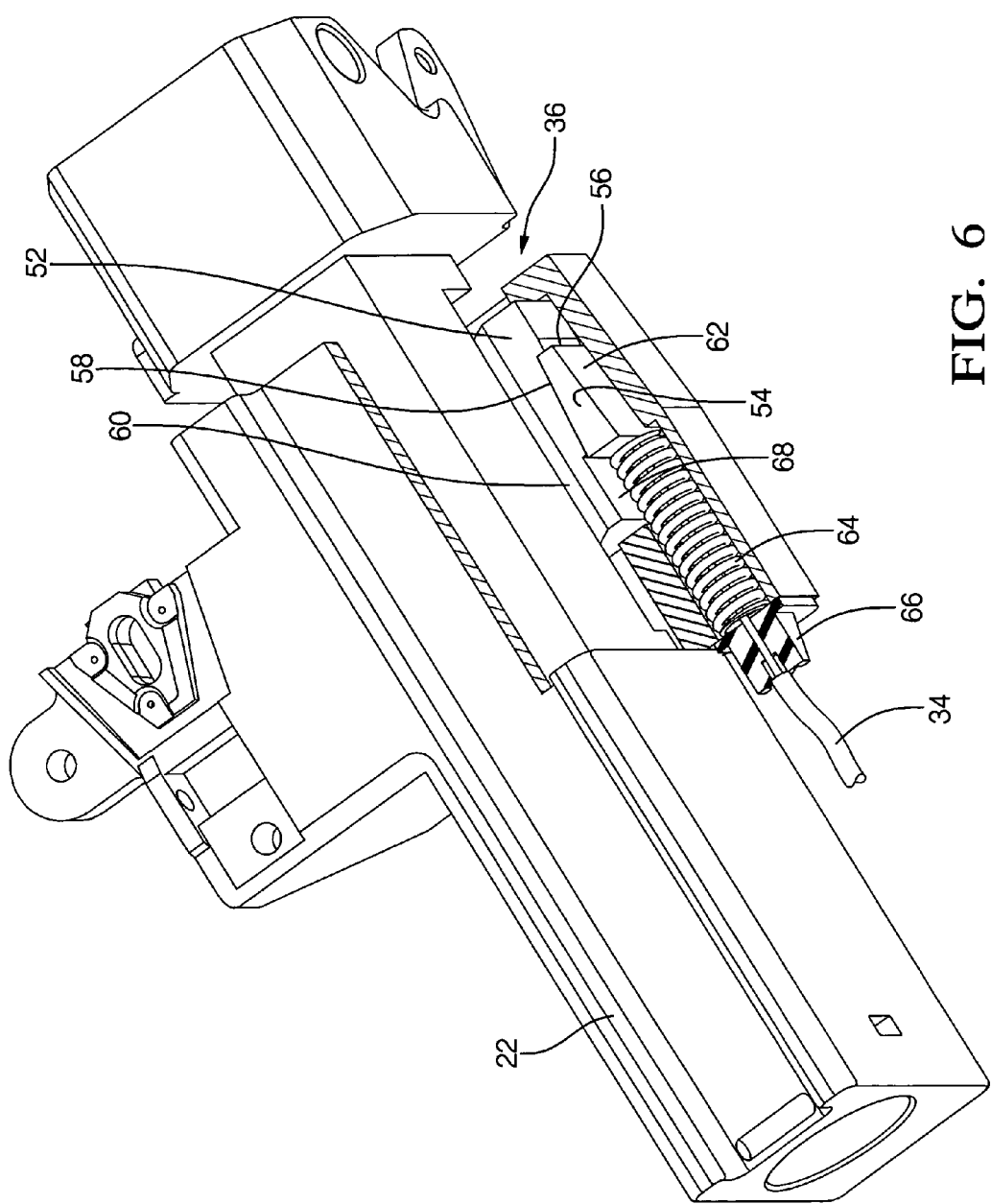
FIG. 6 is a partial cross-sectional view of the steering column assembly of FIG. 5 taken along line 6-6 of FIG. 5.

Turning to FIGS. 5 and 6, a second embodiment of the adjustable steering column assembly 20 is shown wherein like numerals indicate like or corresponding parts. The primary difference between this embodiment and the embodiment of FIGS. 1-4 is the orientation of the longitudinal locking device 36. In particular, the vertical chamber 44 within the outer jacket 22 is now orientated in a sideways substantially parallel relationship to the longitudinal axis A. As such, the second member 54 and biasing device 64 are now sideways and substantially parallel with the longitudinal axis A. This orientation allows the cable 34 to be routed in a different direction (sideways) from the embodiment of FIGS. 1-4.

The change in orientation of the second member 54 in FIGS. 5 and 6 also changes the orientation of the ramp 62 and the chamfer 58 of the second member 54. Accordingly, the chamfer 56 of the first member 52 must also change orientation in order to properly mesh with the chamfer 58 of the second member 54. The chamfer 56 of the first member 52 remains disposed on an opposing side of the first member 52 from the engagement surface 60, but the chamfer 56 and the engagement surface 60 of the first member 52 are angled in transverse directions. Specifically, the engagement surface 60 of the first member 52 is angled inwardly toward a top of the first member 52 with the chamfer 56 of the first member 52 being angled inwardly toward a side of the first member 52. Preferably, a height of the first 52 and second 54 members, as measured transverse to the axis A, is substantially equal such that the chamfer 58 of the second member 54 engages a majority of the chamfer 56 of the first member 52 when in the engaged position. The first member 52 also includes a notch 68 for providing adequate clearance for the biasing device 64.

Figure 7:
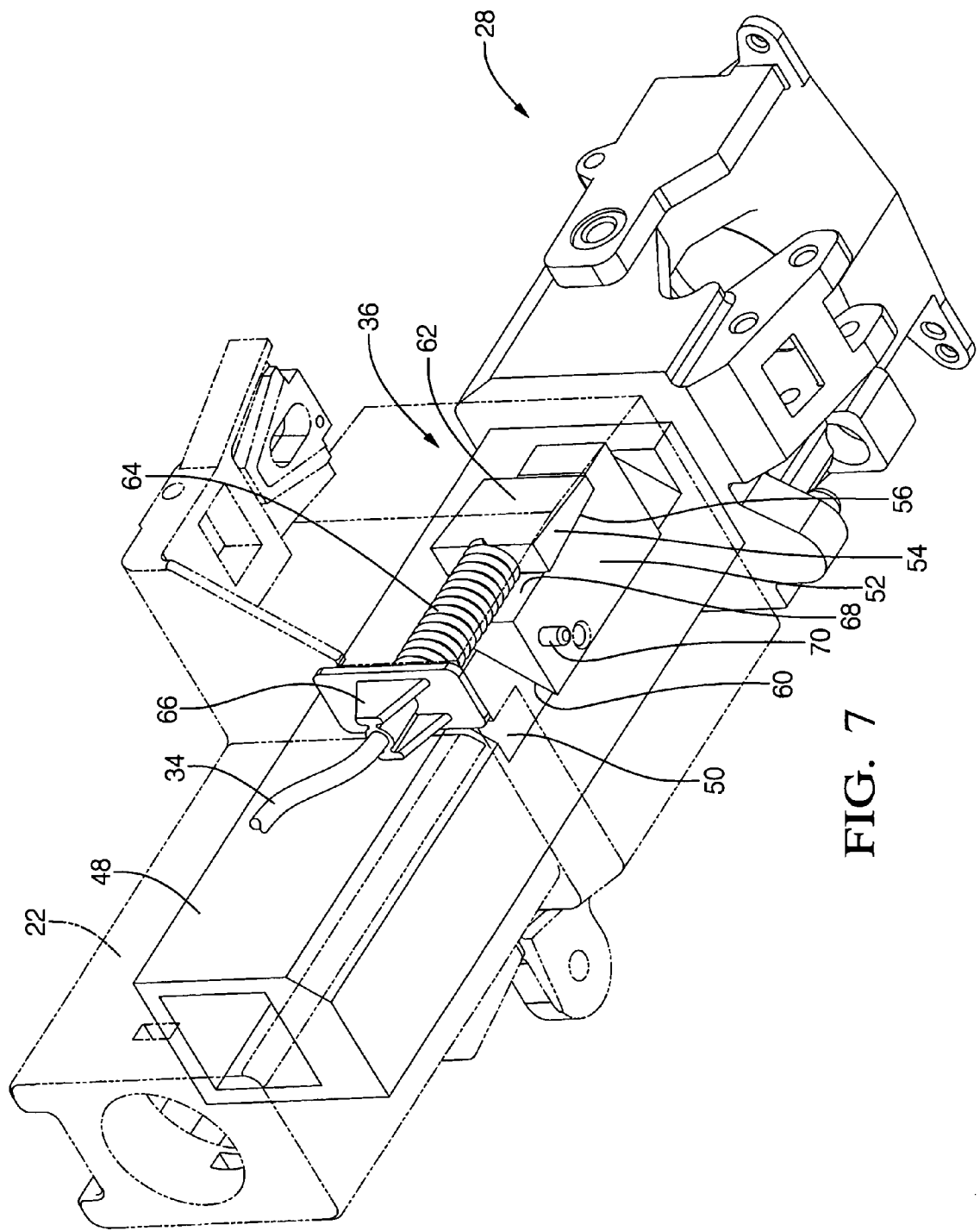
FIG. 7 is an underside view of the adjustable steering column assembly in accordance with a third embodiment of the subject invention with an outer jacket shown in phantom and a longitudinal locking device in an engaged position.
Figure 8:
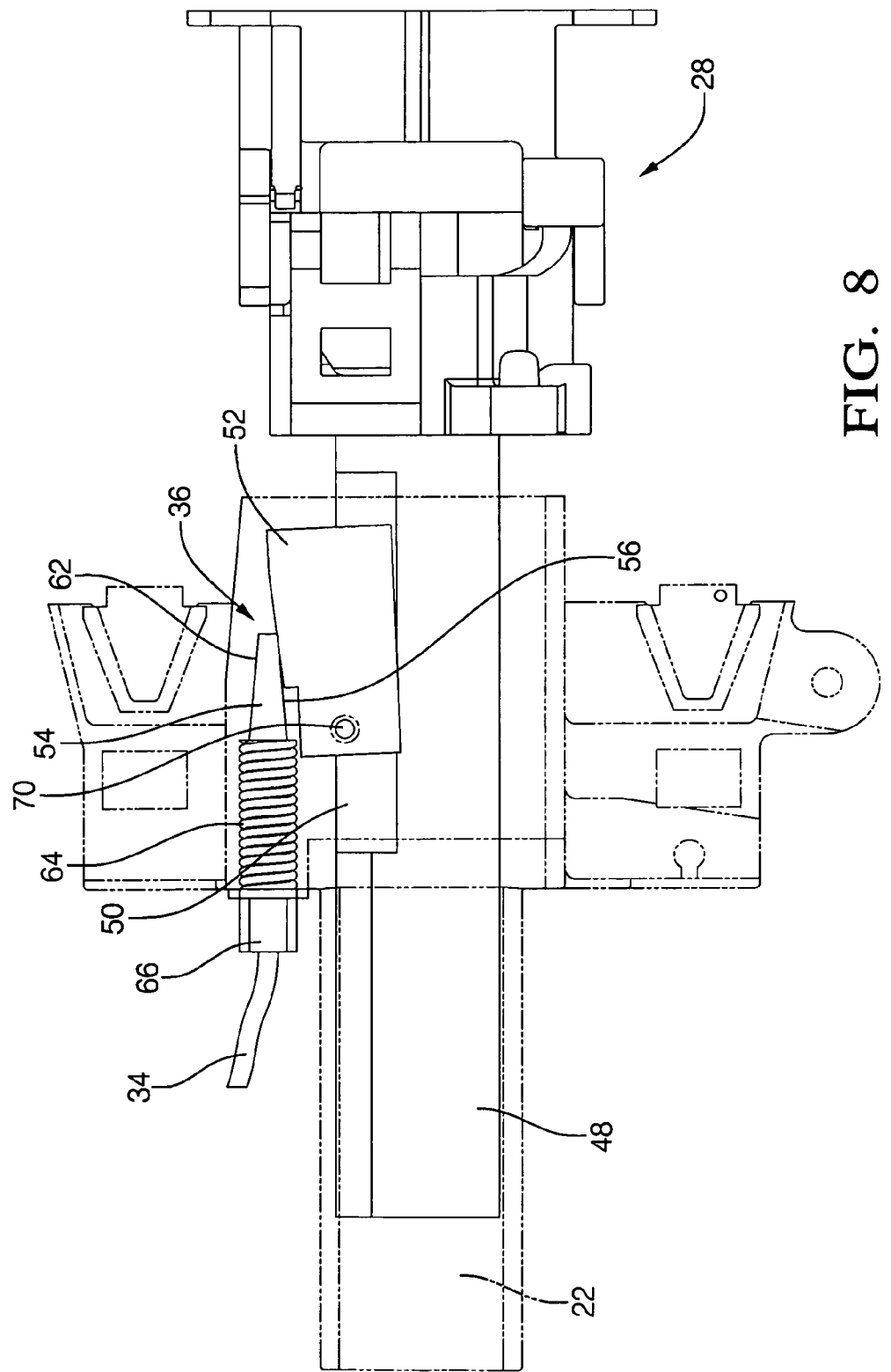
FIG. 8 is another underside view of the adjustable steering column of FIG. 7 with the outer jacket in phantom and the longitudinal locking device in a released position.

Turning to FIGS. 7 and 8, a third embodiment of the adjustable steering column assembly 20 is shown wherein like numerals indicate like or corresponding parts. This embodiment orients the longitudinal locking device 36 in a similar manner as shown in the embodiment of FIGS. 5 and 6. The primary difference with the embodiment of FIGS. 7 and 8 relates to the incorporation of a pivot pin 70 for pivotally connecting the first member 52 to the outer jacket 22. Hence, the first member 52 can move between the released and engaged positions pivotally relative to the inner jacket 48 and the axis A. The incorporation of the pivot pin 70 reduces the likelihood of the first member 52 binding against the second member 54 when extreme loads are applied to the inner jacket 48.

Figure 9:
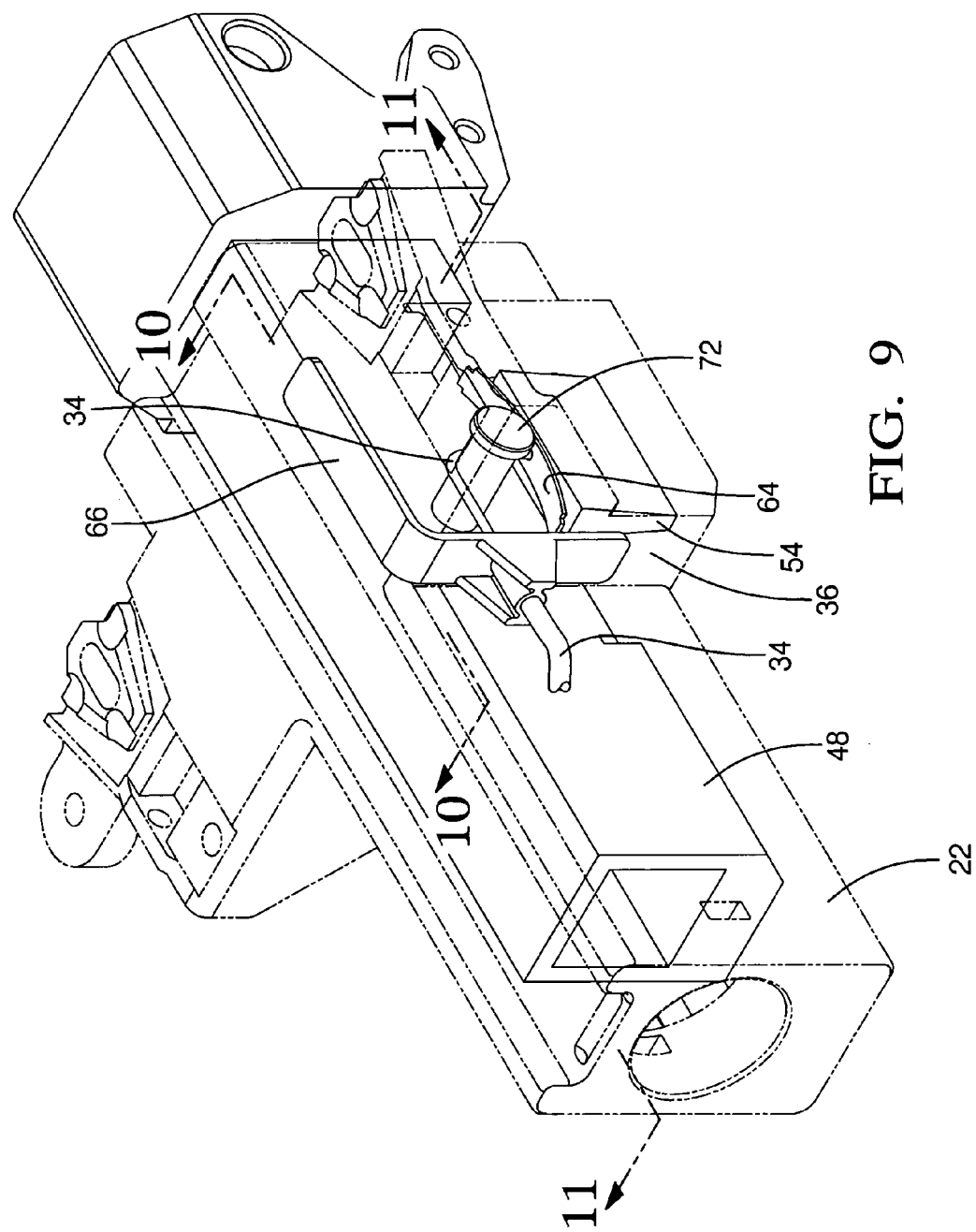
FIG. 9 is a perspective view of an adjustable steering column assembly in accordance with a fourth embodiment of the subject invention with an outer jacket shown in phantom.
Figure 10:
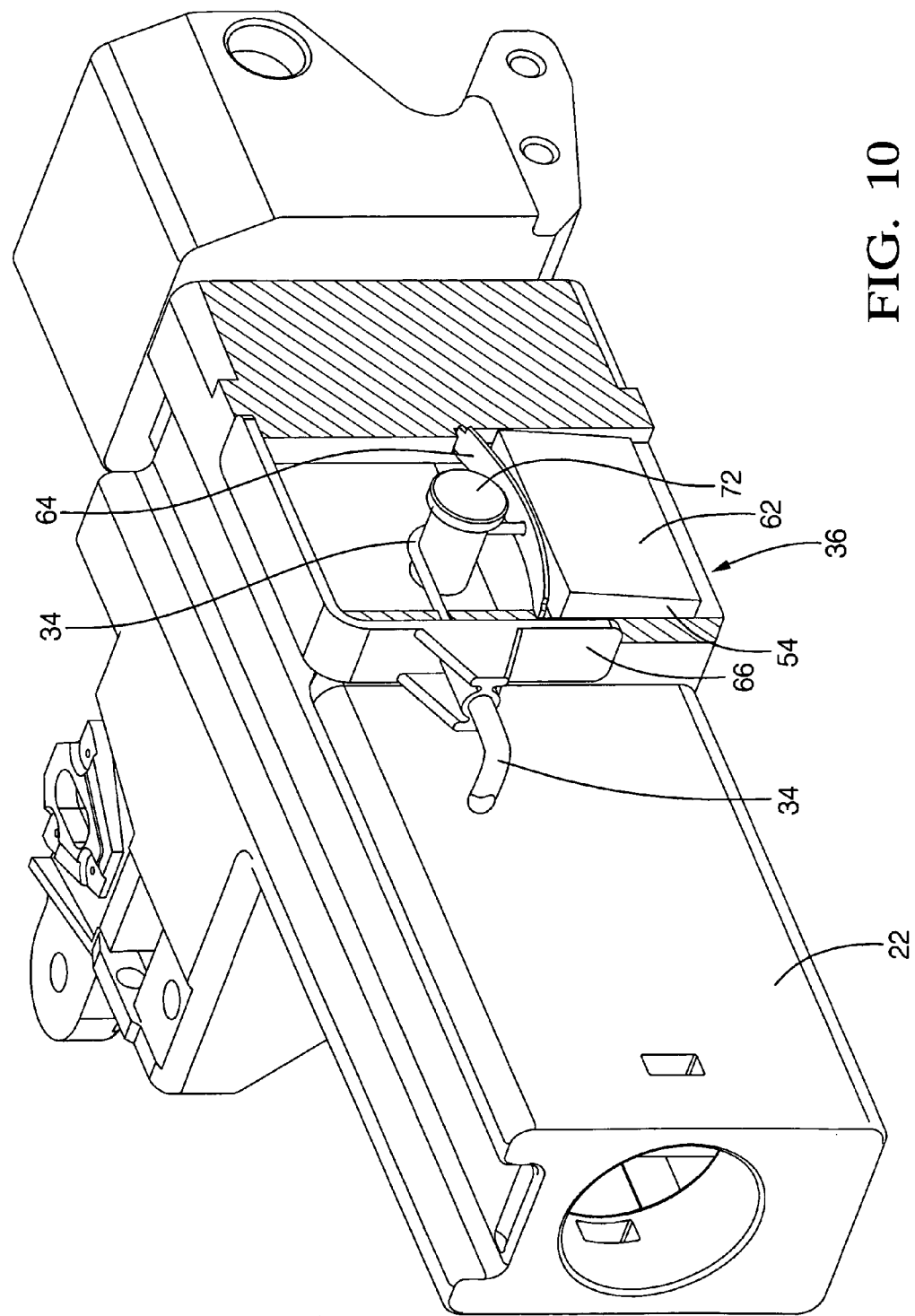
FIG. 10 is a cross-sectional view of the adjustable steering column assembly of FIG. 9 taken along line 10-10 of FIG. 9.
Figure 11:
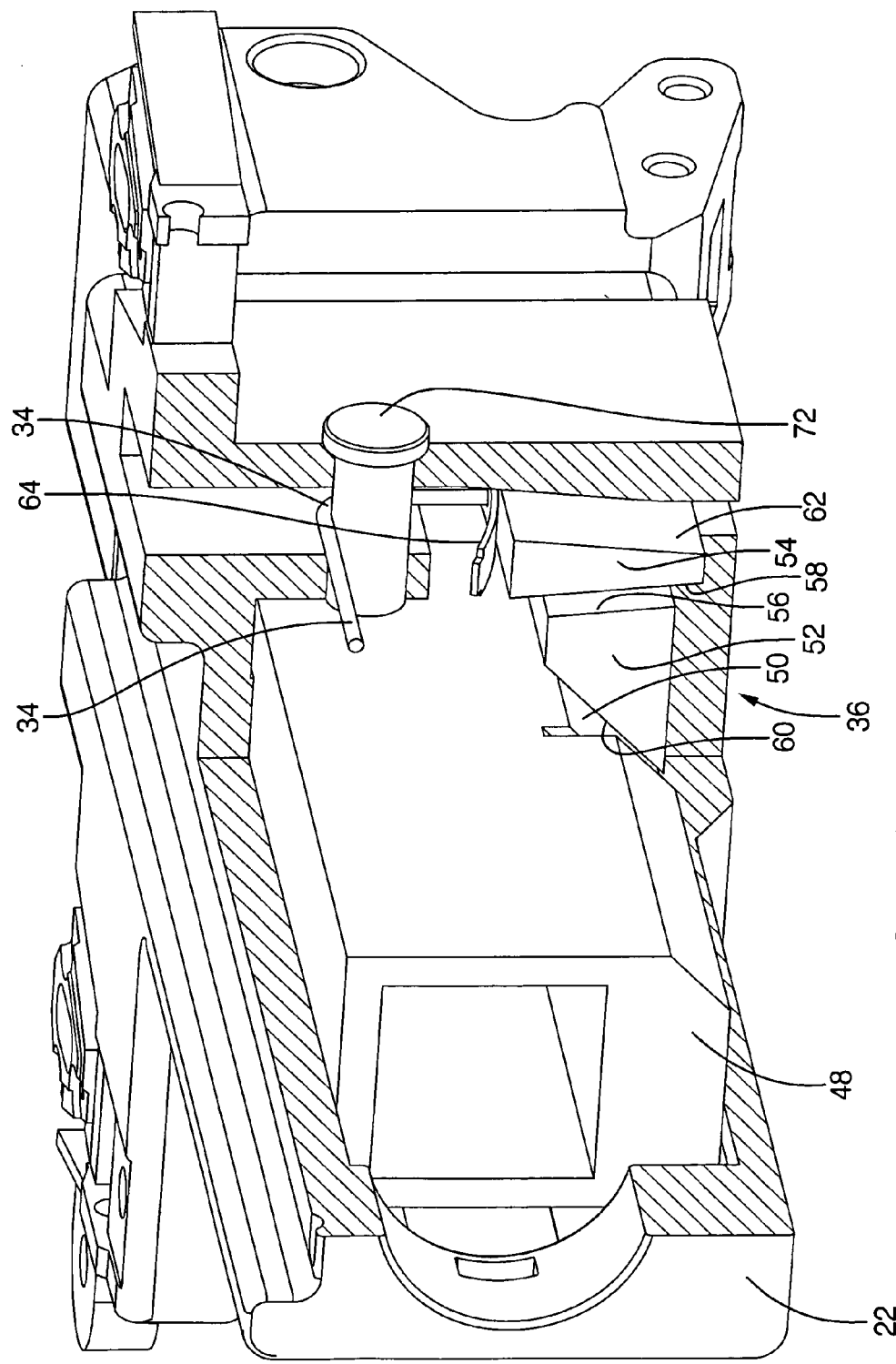
FIG. 11 is a cross-sectional view of the adjustable steering column assembly of FIG. 9 taken along line 11-11 of FIG. 9.

Referring to FIGS. 9-11, a fourth embodiment of the adjustable steering Column assembly 20 is shown wherein like numerals indicate like or corresponding parts. The first 52 and second 54 members of the longitudinal locking device 36 are orientated in a manner similar to the longitudinal locking device 36 of FIGS. 1-4. However, this embodiment incorporates an alternative biasing device 64, which is in the form of a leaf spring. The biasing device 64 engages notches formed in the vertical chamber 44 of the outer jacket 22 and is continuously biased against the second member 54. The cable 34 wraps around a post 72 that is mounted within the outer jacket 22 across the vertical chamber 44. The cable 34 is turned and exits the vertical chamber 44 in a sideways orientation. Pulling of the cable 34 pulls the biasing device 64 upward and releases the biasing force against the second member 54 in a similar manner as described above.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. An adjustable steering column assembly for a vehicle, said assembly comprising:
   an outer jacket defining a longitudinal axis;
   an inner jacket coupled to said outer jacket and movable relative to said outer jacket along said axis between a plurality of longitudinal adjustment positions with said inner jacket having an abutment surface;
   a longitudinal locking device supported by said outer jacket and movable between a released position and an engaged position, said inner jacket longitudinally moveable relative to said outer jacket in said longitudinal locking device released position, said inner jacket longitudinally immoveable relative to said outer jacket in said longitudinally locking device engaged position;
   a tilt housing pivotally coupled to said inner jacket and moveable relative to said inner jacket between a plurality of tilting adjustment positions;
   a tilt locking device disposed between said inner jacket and said tilt housing and moveable between a released position and an engaged position, said tilt housing tiltably moveable relative to said inner jacket in said tilt locking device released position, said tilt housing tiltably immovable relative to said inner jacket in said tilt locking device engaged position;
   a control lever movably mounted to said tilt housing and coupled to both of said longitudinal locking device and said tilt locking device, said devices moveable between their respective released and engaged positions with movement of said control lever;
   said longitudinal locking device having first and second members each having interengaging chamfers, said second member coupled to and moveable with movement of said control lever, said second member chamfer operatively disengaged with said first member chamfer in said longitudinal locking device released position, said second member chamfer operatively engaged with said first member chamfer in said longitudinal locking member engaged position, said first member having an engagement surface abutting said abutment surface of said inner jacket in said longitudinal locking device engaged position, said engagement surface of said first member being complementary in configuration with said abutment surface of said inner jacket, said chamfer of said first member is disposed on an opposing side of said first member from said engagement surface, said second member includes a ramp disposed on an opposing side of said second member from said chamfer of said second member with said ramp engaging said outer jacket; and
   wherein said engagement and abutment surfaces are inclined and are substantially parallel to each other and said axis, and said first member and said inner jacket are in frictionally secured engagement in said longitudinal locking device engaged position.

2. An assembly as set forth in claim 1 wherein said second member is continuously biased toward engagement with said outer jacket and said first member, and said first member is continuously biased toward engagement with said inner jacket.

3. An assembly as set forth in claim 2 wherein said second member is moveable against a biasing force with movement of said longitudinal locking device from its said engaged position toward its said released position.

4. A telescopically adjustable steering column assembly for a vehicle, said assembly comprising:
   an outer jacket to defining a longitudinal axis;
   an inner jacket coupled to said outer jacket and movable relative to said outer jacket along said axis, said inner jacket having an infinite number of adjustment positions relative to said outer jacket along said axis and an abutment surface substantially parallel with said axis; and
   a locking device supported by said outer jacket and movable between a released position and an engaged position, said inner jacket moveable relative to said outer jacket along said axis in said locking device released position, said inner jacket immoveable relative to said outer jacket in said locking device engaged position, said locking device having first and second members each having interengaging chamfers, said second member chamfer operatively disengaged with said first member chamfer in said locking device released position, said second member chamfer operatively engaged with said first member chamfer in said locking device engaged position, said first member having an engagement surface, said engagement surface substantially parallel with and abutting said abutment surface of said inner jacket in said locking device engaged position, said engagement and abutment surfaces being substantially smooth relative to each other and devoid of any interlocking configurations along said longitudinal axis, said chamfer of said first member is disposed on an opposing side of said first member from said engagement surface, and said second member includes a ramp disposed on an opposing side of said second member from said chamfer of said second member with said ramp engaging said outer jacket.

5. An assembly as set forth in claim 4 further including a biasing device through which said ramp is continuously biased toward engagement with said outer jacket, said second member chamfer is continuously biased toward engagement with said first member chamfer, and said first member is continuously biased toward engagement with said inner jacket.

6. An assembly as set forth in claim 5 further including a control lever coupled to said second member, said locking device moveable between its said released and engaged positions with movement of said control lever, said locking device second member moveable against a biasing force with movement of said locking device from its said engaged position toward its said released position.

7. An assembly as set forth in claim 5 wherein said biasing device is further defined as one of a coil spring and a leaf spring.

8. A telescopically adjustable steering column assembly for a vehicle, said assembly comprising:
   an outer jacket to defining a longitudinal axis;
   an inner jacket coupled to said outer jacket and movable relative to said outer jacket along said axis, said inner jacket having an infinite number of adjustment positions relative to said outer jacket along said axis and an abutment surface substantially parallel with said axis; and
   a locking device supported by said outer jacket and movable between a released position and an engaged position, said inner jacket moveable relative to said outer jacket along said axis in said locking device released position, said inner jacket immoveable relative to said outer jacket in said locking device engaged position, said locking device having first and second members each having interengaging chamfers, said second member chamfer operatively disengaged with said first member chamfer in said locking device released position, said second member chamfer operatively engaged with said first member chamfer in said locking device engaged position, said first member having an engagement surface, said engagement surface substantially parallel with and abutting said abutment surface of said inner jacket in said locking device engaged position, said engagement and abutment surfaces being substantially smooth relative to each other and devoid of any interlocking configurations along said longitudinal axis, and said first member has pivotal movement relative to said inner jacket and said axis during a transition of said locking device between its said released and engaged positions.

9. An assembly as set forth in claim 8 further including a pivot pin pivotally connecting said first member to said outer jacket, said pivotal movement being about said pivot pin.

* * * * *